United States Patent
Rowley et al.

(10) Patent No.: US 10,318,835 B2
(45) Date of Patent: *Jun. 11, 2019

(54) EXTRACTION OF DATA FROM A DIGITAL IMAGE

(71) Applicant: GOOGLE LLC, Mountain View, CA (US)

(72) Inventors: Henry Allan Rowley, Sunnyvale, CA (US); Ashok Chhabedia Popat, Menlo Park, CA (US); Michael Edward Jahr, San Francisco, CA (US); Zhifei Li, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,054

(22) Filed: Mar. 7, 2018

(65) Prior Publication Data

US 2018/0239983 A1     Aug. 23, 2018

Related U.S. Application Data

(63) Continuation of application No. 14/743,455, filed on Jun. 18, 2015, now abandoned, which is a
(Continued)

(51) Int. Cl.
*G06K 9/46* (2006.01)
*G06K 9/20* (2006.01)
(Continued)

(52) U.S. Cl.
CPC ....... *G06K 9/2054* (2013.01); *G06K 9/00449* (2013.01); *G06K 9/18* (2013.01);
(Continued)

(58) Field of Classification Search
CPC ............ G06K 9/00442; G06K 9/00456; G06T 7/0002; G06T 2207/30176; G07D 7/00; G07D 7/20; G07D 7/2025
See application file for complete search history.

(56) References Cited

U.S. PATENT DOCUMENTS

| | | | |
|---|---|---|---|
| 8,556,168 B1 | 10/2013 | Lewis et al. | ............. 235/379 |
| 9,092,690 B2 | 7/2015 | Rowley et al. | ......... G06K 9/46 |

(Continued)

FOREIGN PATENT DOCUMENTS

| | | | | |
|---|---|---|---|---|
| EP | 0 104 824 A2 | 4/1984 | ............... | G06K 9/20 |
| WO | 2012/054148 A1 | 4/2012 | ............... | G06K 9/22 |
| WO | 2014/165081 A1 | 10/2014 | ............... | G06K 9/46 |

OTHER PUBLICATIONS

U.S. Appl. No. 13/798,026 to Rowley et al. filed Mar. 12, 2013.
(Continued)

*Primary Examiner* — Andrew W Johns
(74) *Attorney, Agent, or Firm* — Johnson, Marcou & Isaacs, LLC

(57) ABSTRACT

Capturing information from an imprinted item comprises a computing device that receives an image of a back side of an imprinted item, the payment instrument comprising information imprinted thereon such that the imprinted information protrudes from a front side of the imprinted item and the imprinted information is indented into the back side of the imprinted item. The computing device extracts sets of characters from the image of the back side of the imprinted item based on the imprinted information indented into the back side of the imprinted item and depicted in the image of the back side of the imprinted item. The computing device applies a first character recognition application to process the sets of characters extracted from the image of the back side of the imprinted item and categorizes each of the sets of
(Continued)

characters into one of a plurality of categories relating to the information.

19 Claims, 5 Drawing Sheets

Related U.S. Application Data continuation of application No. 13/798,026, filed on Mar. 12, 2013, now Pat. No. 9,092,690.

(51) Int. Cl.

| | | |
|---|---|---|
| *G06K 9/00* | (2006.01) | |
| *G06K 9/18* | (2006.01) | |
| *G06K 9/62* | (2006.01) | |
| *G06Q 20/10* | (2012.01) | |
| *G06K 9/72* | (2006.01) | |
| *G06Q 20/34* | (2012.01) | |
| *G06Q 20/38* | (2012.01) | |

(52) U.S. Cl.
CPC ............ *G06K 9/46* (2013.01); *G06K 9/6267* (2013.01); *G06K 9/72* (2013.01); *G06Q 20/102* (2013.01); *G06K 2209/01* (2013.01); *G06Q 20/3567* (2013.01); *G06Q 20/382* (2013.01)

(56) References Cited

U.S. PATENT DOCUMENTS

| | | | |
|---|---|---|---|
| 2004/0223648 A1 | 11/2004 | Hoene et al. ................. 382/218 |
| 2005/0047660 A1 | 3/2005 | Tanaka .......................... 382/176 |
| 2006/0091223 A1 | 5/2006 | Zellner et al. ................ 235/492 |
| 2006/0131389 A1 | 6/2006 | Kwon ........................... 235/380 |
| 2009/0173784 A1 | 7/2009 | Yang ............................. 235/380 |
| 2010/0008535 A1 | 1/2010 | Abulafia et al. .............. 382/100 |
| 2010/0084476 A1 | 4/2010 | Zellner et al. ................ 235/492 |
| 2012/0050305 A1 | 3/2012 | Song et al. ................... 345/589 |
| 2012/0284185 A1 | 11/2012 | Mettler et al. .................. 705/44 |
| 2012/0310760 A1 | 12/2012 | Phillips et al. .............. 705/26.1 |
| 2014/0044303 A1 | 2/2014 | Chakraborti .......... G06T 7/0002 |
| 2014/0052636 A1 | 2/2014 | Mattes ................. G06Q 20/409 |
| 2014/0112526 A1 | 4/2014 | Kim et al. .................... 382/103 |
| 2014/0119616 A1 | 5/2014 | Wooldridge ....... H04N 1/19594 |
| 2014/0270329 A1 | 9/2014 | Rowley et al. ........... G06K 9/46 |
| 2015/0287002 A1 | 10/2015 | Rowley et al. ...... G06Q 20/102 |

OTHER PUBLICATIONS

U.S. Appl. No. 14/743,455 to Rowley et al. filed Jun. 18, 2015.
Alecu, "European Office Action issued in European Application No. 14778802.0", dated Feb. 6, 2018, 4 pages.
Alecu, "Extended European Search Report issued in European Application No. 14778802.0", dated Dec. 22, 2016, 8 pages.
Anonymous, "Card.io- fast and easy mobile credit card scanning : Hacker News", Jun. 24, 2011, 7 pages.
Kang, "International Search Report and Written Opinion issued in International Application No. PCT/US2014/024330", dated Jul. 17, 2014, 11 pages.
See, "U.S. Office Action issued in copending U.S. Appl. No. 14/743,455, filed Jun. 18, 2015", dated Jun. 29, 2017, 23 pages.
See, "U.S. Office Action issued in copending U.S. Appl. No. 14/743,455, filed Jun. 18, 2015", dated Dec. 22, 2017, 24 pages.
Wittmann-Regis, "International Preliminary Report on Patentability issued in International Application No. PCT/US2014/024330", dated Sep. 24, 2015, 8 pages.
Chinese Patent Office, "Chinese Office Action issued in Chinese Application No. 201480023971.6", dated Oct. 8, 2016, 9 pages of English Translation and 8 pages of Chinese Office Action.
Chinese Patent Office, "Chinese Office Action issued in Chinese Application No. 201480023971.6", dated May 9, 2017, 9 pages of English Translation and 6 pages of Chinese Office Action.

EXTRACTION OF DATA FROM A DIGITAL IMAGE

CROSS REFERENCE TO RELATED APPLICATIONS

This application is a continuation of and claims priority to U.S. patent application Ser. No. 14/743,455, filed Jun. 18, 2015, and entitled "Extraction of Financial Account Information from A Digital Image of A Card," which is a continuation of U.S. patent application Ser. No. 13/798,026, filed Mar. 12, 2013, and entitled "Extraction of Financial Account Information from A Digital Image of A Card," now U.S. Pat. No. 9,092,690 issued on Jul. 28, 2015. The complete disclosure of the above-identified priority applications is hereby fully incorporated herein by reference.

TECHNICAL FIELD

The present disclosure relates to systems and methods for data extraction of an image of an imprinted item, and, more particularly, to capturing an image of the reverse side of the item to extract data.

BACKGROUND

Entering data into computing devices can be cumbersome and prone to errors. Information entry difficulties are multiplied for users entering data on mobile devices with smaller keyboards or screens. When information from images is being manually entered, the item in the image must often be flipped over to enter additional information from the reverse side of the item.

SUMMARY

One aspect of the example embodiments described herein provides a computer-implemented method for capturing information from an imprinted item, such as an identify card. The method comprises receiving, using one or more computer devices, an image of a back side of the item, the item comprising information imprinted thereon such that the imprinted information protrudes from a front side of the item and the imprinted information is indented into the back side of the item. The one or more computing devices extract sets of characters from the image of the back side of the imprinted item based on the imprinted information indented into the back side of the imprinted item and depicted in the image of the back side of the imprinted item and applies a first character recognition application to process the sets of characters extracted from the image of the back side of the imprinted item. The one or more computing devices categorize each of the sets of characters into one of a plurality of categories relating to information for the particular type of imprinted item.

These and other aspects, objects, features and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
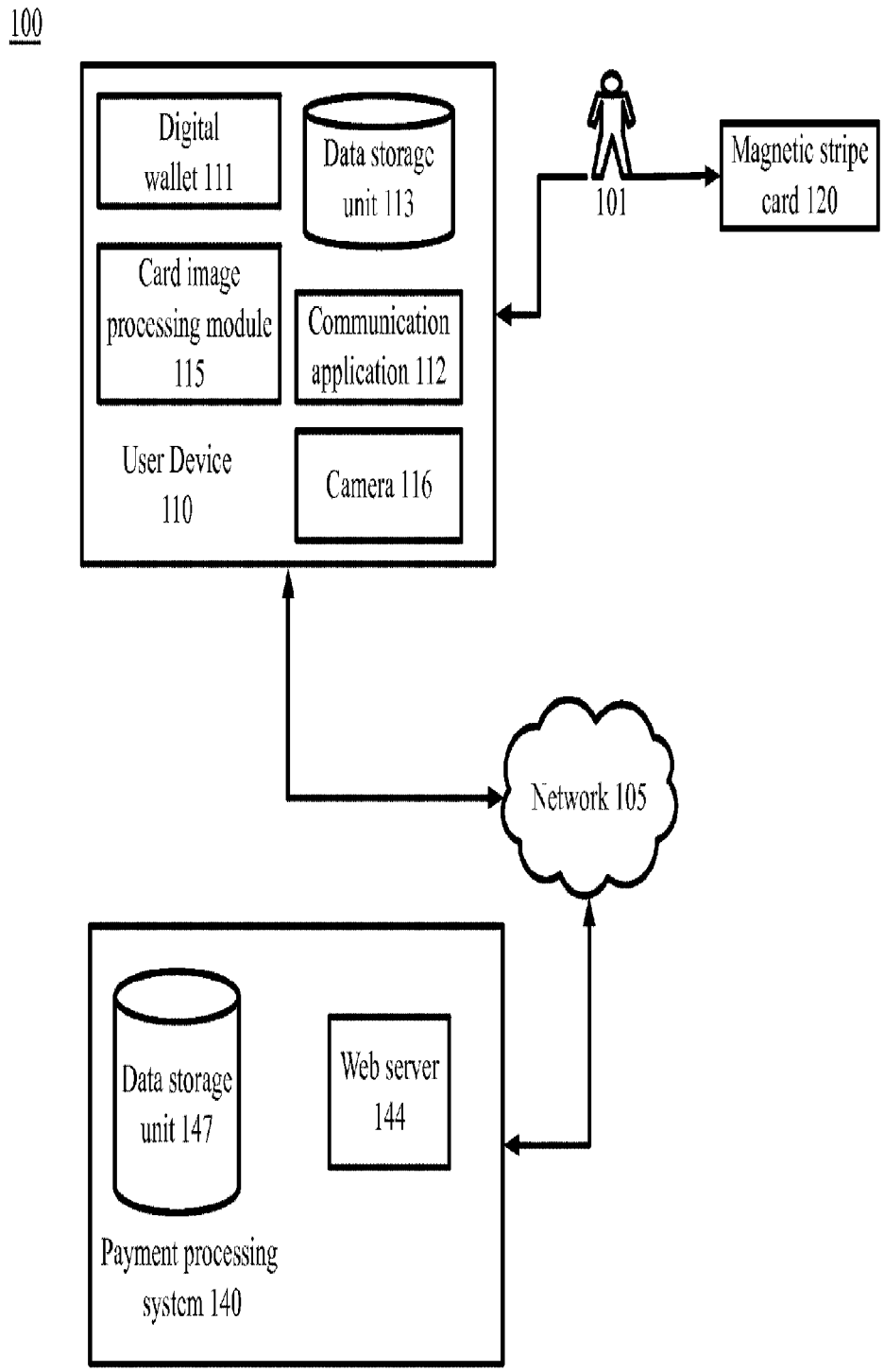
FIG. 1 is a block diagram depicting a payment system using card image detection, in accordance with certain example embodiments.

Embodiments herein provide computer-implemented techniques for using an image of the reverse side (back) of a card to recognize the characters and related information on the card. Throughout the specification, the general term "card" will be used to represent any type of physical card instrument, such as a magnetic stripe card. In example embodiments, the different types of card represented by "card" can include credit cards, debit cards, stored value cards, loyalty cards, identification cards, or any other suitable card representing an account of a user or other information thereon.

The user can employ the card when making a transaction, such as a purchase, ticketed entry, loyalty check-in, or other suitable transaction. The card is typically a plastic card containing the account information and other data on the card. In many card embodiments, the customer name, expiration date, and card numbers are physically embossed on the card. The embossed information is visible from both the front and back of the card, although the embossed information is typically reversed on the back of the card.

A user may desire to enter the information from the card into a user computing device or other computing device, for example, to conduct an online purchase, to conduct a purchase with a mobile computing device or other computing device, to add the information to a wallet application on a computing device, or for any other suitable reason. In an example, the user desires to use a mobile computing device to conduct a purchase transaction using a digital wallet application module executing on the mobile computing device. The digital wallet application module may require an input of the details of a particular user payment account to conduct a with the particular user payment account or to set up the account. Due to the small screen size and keyboard interface on a mobile device, such entry can be cumbersome and error prone. Additionally, a merchant may need to capture card information to conduct a transaction or for other reasons.

In addition to account identifiers, the front of the card typically contains logos of the issuer of the card, pictures chosen by the user or the issuer, other text describing the type or status of the user account, a security code, and other marketing and security elements, such as holograms or badges. The user name, card expiration date, and the account identifier, such as a credit card number, are typically embossed on the front of the card such that the information protrudes from the front of the card.

The back, or reverse, of the card contains the reverse of the embossed information. That is, the embossing of the information from the front of the card is visible on the back of the card, but in a reversed script and being depressed into the back of the card. The embossed information on the back of the card may not be colored as text, but the information is readable due to the indentation of the information into the back of the card. The back of the card may contain other information, such as a security code, issuer phone number, and signature of the user. The back of the card may be used for information capturing, and the pictures, holograms, and other elements on the front of the card are not present on the back of the card to hinder the capturing of the account information from the back of the card. Additionally or alternatively, the user may desire to capture the information on the back of the card that is not included on the front of the card, such as the security code and signature of the user.

The user employs a mobile phone, digital camera, or other user computing device to capture an image of the back of the card associated with the account that the user desires to input into the mobile computing device.

A card image processing module on the user computing device receives the image of the back of the card. The card image processing module processes the image to remove perspective distortion. For example, the image may not have been captured from the preferred angle, or the card in the image may not fit the required frame for the image. The card image processing module can alter or resize the image to fit any required parameters for processing in the manner in which the image processing module is configured to process images. In an example, the card image processing module can detect the corners or edges of the card in the image and then map the corners or edges to a rectangle of the correct ratios for a credit card. The card image processing module can perform any other required image adjustments to provide a clear and useful image suitable for processing to obtain information included therein.

The card image processing module detects the reversed embossed characters on the back of the card. For example, the card image processing module can detect the credit card number, name, expiration date, and other embossed information from the back of card. The detection can leverage known specifications for where characters are embossed within the space of the card, by analyzing specific locations on the card for the corresponding information included in each specific location. Additionally, the card image processing module can search the image of the card for information that is not located in an expected location. The card image processing module can employ character recognition algorithms or related techniques to identify a set of characters from the information identified on the card.

Once embossed characters are located within the image of the back of the card, they can be reversed, or mirrored, for normal recognition. That is, as the embossed images on the back of the card are reversed, the card image processing module can process the characters to provide a mirror image of the characters to allow a character recognition algorithm to interpret the characters. After processing, the embossed set of characters appears "debossed" and reversed from the image. Alternatively, a reverse character recognition algorithm may be used that is capable of interpreting reversed characters.

The card image processing module can additionally or alternatively detect additional printed information from the back of the card that is not embossed or reversed. For example, the security code, signature, issuer name, address, and phone number, and other information of the issuing institution are generally not embossed and are generally located on the back of a card.

After processing the information from the image to obtain an alpha-numeric character set for the information from the image, the card image processing module can verify uncertain detection with the user. For example, the user may be queried to verify the processed information via a user interface provided by the card image processing module or the user computing device. The user may be prompted to verify the card information as a default for some or all of the information. Alternatively, the user may only be required to verify information if the detection algorithms have a low confidence in the accuracy of the processed information.

The card image processing module can categorize the information obtained from the card. For example, the card image processing module can determine that a set of characters from the card relates to the account number, the user name, the expiration data, and other suitable information. The set of characters can be stored in the card image processing module with a designation associating the series of characters with the appropriate category. For example, a series of 16 numbers would be associated with an account identifier. A four digit series with a "/" in the middle would be associated with an expiration date.

The card image processing module can provide detected card information for further processing. In certain embodiments, the information may be communicated to a payment processing system or other computing system to process a payment or other operation associated with the card. For example, the card image processing module can communicate the card information to a digital wallet application module executing on the user computing device or otherwise associated with the user of the card for use in a transaction with a merchant or other entity. In another example, the user computing device can use the card information to populate a payment form or other online transaction form to conduct a transaction. In another example, a merchant can use the card information to populate a transaction page on a point of sale terminal or other transaction user interface. The card information can be employed for any other suitable purpose.

In an example embodiment, correlation between images of the front and back of the card may help improve the accuracy of reading the card. An image of the front of the card may be harder to read because of background images, the embossing, and other information provided on the front of the card. The back of the card often overlaps with customer service information, the signature, or other images or information. Thus, errors may occur when extracting the characters and other user information from an image of the card.

Since both the front and the back of the card contain some of the same user information, for example, the embossed information, the card image processing module can compare information from the front of the card with information from the back of the card and note similarities and differences. Information from the front of the card that matches the information from the back of the card can be expected to be more accurate. If the information from the front of the card does not match the same information on the back of the card, then the card image processing module may require user input to select or input the correct information.

To compare the information from the images of the front and back of the card, the card image processing module can perform the method described previously to obtain the information from the back of the card and can perform a similar method to obtain the information from the front of the card. After determining the category of each series of characters from the images of the front and back of the card, the card image processing module can compare the information from the front of the card with the information from the back of the card.

For example, the card image processing module can compare a series of characters from the back associated with the user name to the series of characters from the front associated with the user name. The card image processing module can use the comparison to determine a confidence score for the accuracy of the user name. If the comparison produces an exact match, then the confidence score for the user name would be high. If a conflict exists between the two, then the confidence score for the user name would be lower. The relative confidence score can depend on a number of conflicts between the information from the front and back sides of the card. If the confidence score is below a configurable threshold, the card image processing module may request an input from the user to verify the correct information. For example, the card image processing module may provide the results extracted from the front of the card and the results extracted from the back of the card and allow the user to select the correct information or input alternate information.

In an example embodiment, the card image processing module can apply independent character recognition applications to the characters on the front and back of the card. For example, the card image processing module can host two or more character recognition applications and apply one character recognition application to the front of the card and a different character recognition application to the back of the card. After determining the category of each series of characters, the card image processing module can compare the information from the front of the card with the information from the back of the card to improve the accuracy of the information. The agreement of different character recognizer processing applications on the characters on the front and back of the card can provide a greater degree of confidence in the extracted information.

In another example embodiment, the card image processing module can extract features from corresponding locations on the front and back of the card, and feed the combined features into a single classifier. The card image processing module can extract the embossed characters from the same area of the card on the front and the back. For example, the card image processing module can extract the account number from the front of the card and combine the characters with the characters extracted from the same, although reversed, location on the back of the card.

The card image processing module can reverse one of the sets of characters and process the two sets of characters together to achieve a more accurate set of characters. The card image processing module can apply a character recognition application to the characters to identify the set of characters and categorize the information.

In another example embodiment, the card image processing module can search for and identify correlations between pixels on the front and back of the card, and extract pixels for which there are strong correlations. The card image processing module can process digital images of the front and back of the card and compare the individual pixels searching for correlations and differences. The pixels with high correlations are likely to be corresponding parts of characters rather than of the backgrounds. The correlated pixels can allow a greater level of accuracy when identifying and recognizing characters.

In another example embodiment, the card image processing module can use more than one source to extract additional information. The card image processing module can process multiple images of the front, the back, or both. For example, the user can provide multiple images captured from different angles to allow the card image processing module to better filter shadows, scratches, or other obstructions. Additionally or alternatively, the user can provide a video moving across the card such that many angles can provide more information to the card image processing module for processing.

Although described herein as executing on the user computing device, the card image processing module can execute on any suitable computing device. For example, the card image processing module can execute on a payment processing system, a merchant point of sale system, a digital wallet account management system, or other suitable computing system. In these embodiments, the captured images of the front and back of the card are communicated from the image capture device to the processing computing system for processing of the image information.

Example System Architectures

Turning now to the drawings, in which like numerals represent like (but not necessarily identical) elements throughout the figures, example embodiments are described in detail.

FIG. 1 is a block diagram depicting a system for capturing an image of the front and/or reverse side of a credit card to gather credit card information, in accordance with certain example embodiments. As depicted in FIG. 1, the system 100 includes network devices 110 and 140 that are configured to communicate with one another via one or more networks 105.

Each network 105 includes a wired or wireless telecommunication means by which network devices (including devices 110 and 140) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network device 110 and 140 includes a device having a communication module capable of transmitting and receiving data over the network 105. For example, each network device 110 and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110 and 140 are operated by end-users and payment system operators, respectively.

Figure 5:
FIG. 5 depicts the back side of a magnetic stripe card, in accordance with certain example embodiments.

The user computing device 110, payment processing system 140, and any other computing machines associated with the technology presented herein may be any type of computing machine such as, but not limited to, those discussed in more detail with respect to FIG. 5. Furthermore, any modules associated with any of these computing machines such as the card image processing module 115 or any other modules (scripts, web content, software, firmware, or hardware) associated with the technology presented herein may by any of the modules discussed in more detail with respect to FIG. 5. The computing machines discussed herein may communicate with one another as well as other computer machines or communication systems over one or more networks such as network 105. The network 105 may include any type of data or communications network including any of the network technology discussed with respect to FIG. 5.

The user 101 can use the communication application 112, which may be, for example, a web browser application or a stand-alone application, to view, download, upload, or otherwise access documents or web pages via a distributed network 105. The network 105 includes a wired or wireless telecommunication system or device by which network devices (including devices 110 and 140) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The communication application 112 can interact with web servers or other computing devices connected to the network 105, including the web server 144 of the payment system 140.

The user network device 110 may include a digital wallet application module 111. The digital wallet application module 111 may encompass any application, hardware, software, or process the user computing device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user computing device 110 can include a card image processing module 115. The card image processing module 115 can interact with the communication application 112 or be embodied as a companion application of the communication application 112 and execute within the communication application 112. The card image processing module 115 may further be embodied as a companion application of the digital wallet application module 111 and execute within the digital wallet application module 111. The card image processing module 115 may employ a software interface for configuration that may open in the digital wallet application module 111 or may open in the web browser application 112. Alternatively, the card image processing module 115 may be execute on the user computing device 110 independent of the digital wallet application module 111 and the communication application 112. The card image processing module 115 can be operable to process an image of payment instrument card or other image of a payment instrument and to extract useful information from the image to facilitate a transaction.

Any functions of the card image processing module 115 can be performed by the digital wallet application 111 or other module or application on the user computing device or the payment processing system 140.

The user computing device 110 also includes a data storage unit 113 accessible by the digital wallet application module 111, the proxy card application 115, and the communication application 112. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory cards or removable flash memory.

The user 101 may use the user computing device 110 or other network device to register the card image processing module 115 and/or access the payment system account of the user 101. The user computing device 110 may comprise appropriate technology that includes or is coupled to a web server.

Credit cards, debit cards or other payment instrument can be represented as a magnetic stripe card 120. The magnetic stripe card 120 can be used to conduct transactions with payment accounts such as debit cards, credit cards, gift cards/stored value cards, loyalty cards/reward cards, peer-to-peer payment accounts, coupons, prepaid or other offers, and other accounts used to make a purchase or redeem value added services.

The magnetic stripe card 120 can be a physical payment card comprising a magnetic stripe or other machine-readable portion comprising the user's proxy card account identifier and other payment information. In this case, the user scans or swipes the magnetic stripe card 120 at a merchant POS terminal to communicate the magnetic stripe card account identifier and other transaction data to the POS terminal. Additionally or alternatively, the magnetic stripe card 120 can be represented as any other suitable payment instrument, such as an RFID device or a smartcard.

The payment processing system 140 includes a data storage unit 147 accessible by the web server 144. The example data storage unit 147 can include one or more tangible computer-readable storage devices. The payment processing system 140 is operable to conduct contactless payments between a user 101. The payment processing system 140 is further operable to maintain a database to store transactions of a merchant system and the user 101, and other suitable functions.

The user 101 can use a web server 144 on the payment processing system 140 to view, register, download, upload, or otherwise access the payment processing system 140 via a website (not illustrated) and a communication network 105). The user 101 associates one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101. The payment processing system 140 also may function as the issuer for the associated financial account. The user's 101 registration information is saved in the payment processing system's 140 data storage unit 147 and is accessible the by web server 144.

Figure 4:
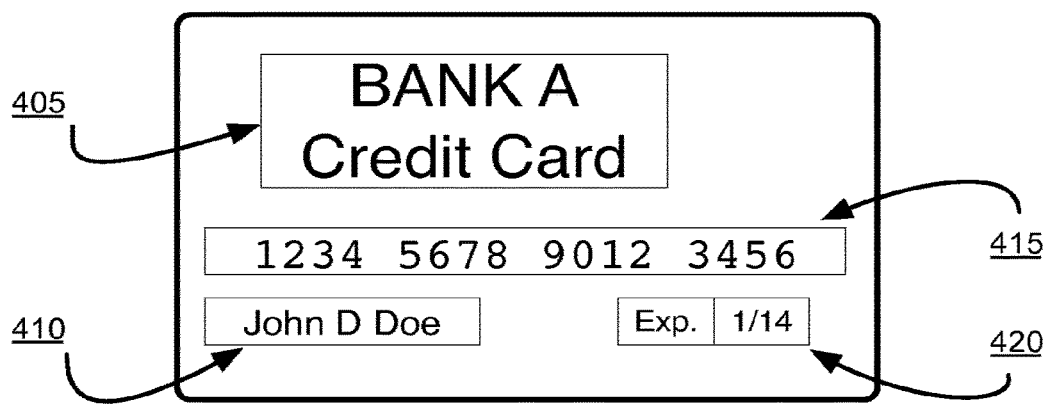
FIG. 4 depicts the front side of a magnetic stripe card, in accordance with certain example embodiments.

FIG. 4 depicts the front side of a magnetic stripe card 120, in accordance with certain example embodiments. In the example, the magnetic stripe card is a credit card issued by Bank A. The magnetic stripe card 120 could be any other payment instrument, such as a debit card, a credit card, a gift card/stored value card, a loyalty card/reward card, a peer-to-peer payment account, a coupon, a prepaid or other offer, and other accounts used to make a purchase or redeem value added services.

In the example, the magnetic stripe card 120 displays a logo 405 or other text or diagram identifying the issuer of the credit card, the card network the card employs, or other identifiers of the card 120. The magnetic stripe card 120 has a number 415 identifying the account number of the user 101. The account number 415 can be any combination of characters, such as numbers or letters, which can identify the account of the user 101 when the magnetic stripe card 120 is used in a transaction. The magnetic stripe card 120 displays the name 410 of the user 101. The magnetic stripe card 120 displays an expiration date 420 of the magnetic stripe card 120. The expiration date 420 is established by the payment processing system 140 or other issuer of the magnetic stripe card 120. Typically, the account number 415, the user name 410, and the expiration date 420 are embossed on the card or otherwise rendered in raised letters and numbers.

FIG. 5 depicts the back side of a magnetic stripe card 120, in accordance with certain example embodiments. The magnetic stripe card 120 has a magnetic strip 505. The magnetic stripe 505 can store information associated with the account of the user 101, such as the account number, the issuer, the expiration date, and other suitable information. The magnetic stripe 505 can transmit the information to a merchant system via a card reader or other suitable merchant point of sale component capable of reading the information from the magnetic stripe card 120. The magnetic stripe card 120 has a location for the signature 535 of the user 101. The user 101 can sign the magnetic stripe card 120 for comparison with the signature of a user 101 at the time of a purchase. The magnetic stripe card 120 has information 530 associated with the issuer of the magnetic stripe card 120, such as the phone number and a website. The magnetic stripe card 120 has a security code 525 or other suitable code on the magnetic stripe card 120 for verifying the authenticity of the magnetic stripe card 120.

In the example, the account number 415, user name 410, and the expiration date 420 are embossed on the front of the magnetic stripe card 120 and reverse of the embossed characters can be read on the back of the magnetic stripe card 120. The reversed characters will be debossed on the back of the magnetic stripe card 120. That is, any character that is embossed on the front of the magnetic stripe card 120 will typically be debossed on the back of the magnetic stripe card 120. Thus, the account number 515 can be the reversed, debossed characters of the account number 415 from the front of the magnetic stripe card 120. The magnetic stripe card 120 displays the reversed name 510 of the user 101. The magnetic stripe card 120 displays a reversed expiration date 520 of the magnetic stripe card 120. In alternate examples, other data from the front of the magnetic stripe card 120 are embossed. In another alternate example, none of the data is embossed. The data can be reproduced on the back of the magnetic stripe card 120 in regular or reversed characters.

Example Processes

Figure 2:
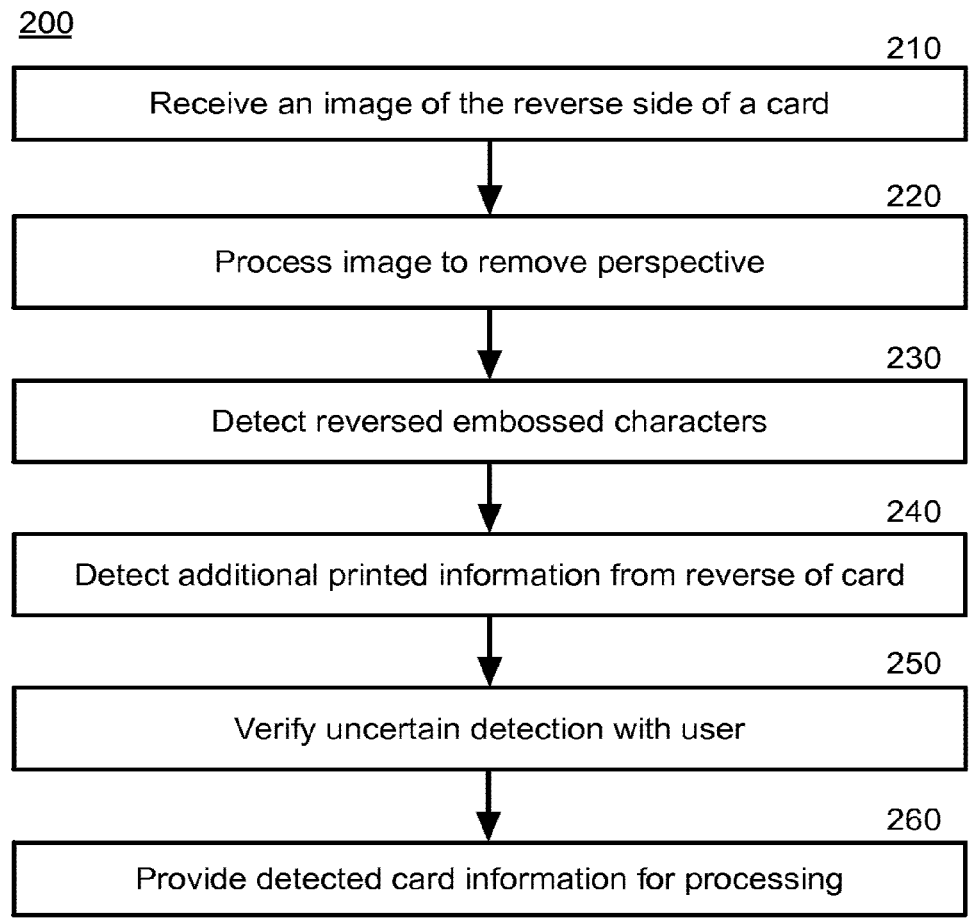
FIG. 2 is a block flow diagram depicting a method for detecting card information from a reverse side image of a card, in accordance with certain example embodiments.
Figure 3:
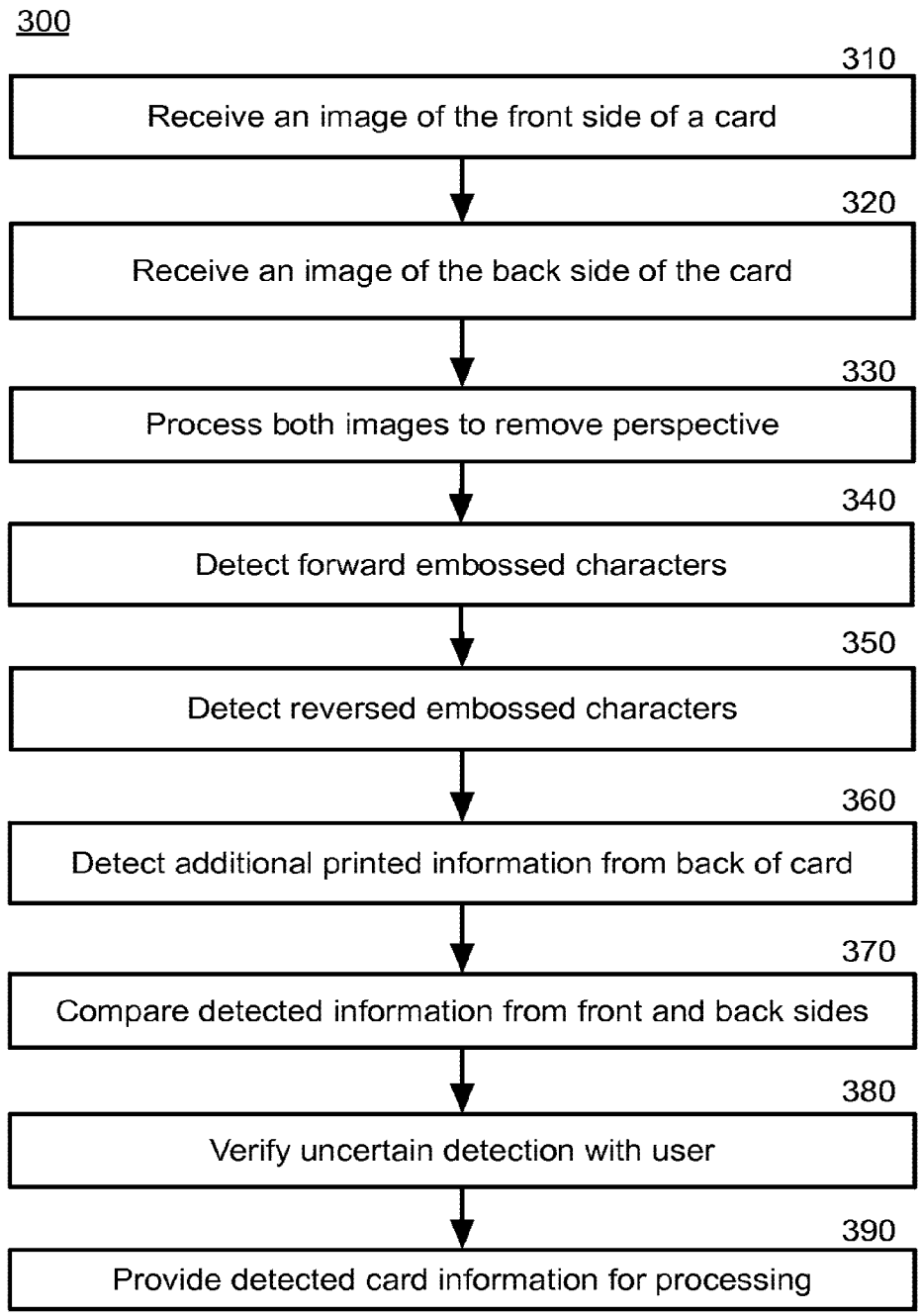
FIG. 3 is a block diagram depicting a method for detecting card information by comparing results from front and reverse side image detection, in accordance with certain example embodiments.

The example methods illustrated in FIG. 2-3 are described hereinafter with respect to the components of the example operating environment 100. The example methods of FIG. 2-3 may also be performed with other systems and in other environments.

FIG. 2 is a block flow diagram depicting a method 200 for method for detecting card information from a reverse side image of a card, in accordance with certain example embodiments.

With reference to FIGS. 1 and 2, in block 210, a card image processing module 115 on the user computing device 110 receives an image of the back of a magnetic stripe card 120. The user 101 employs a mobile phone, digital camera, or other user computing device 110 to capture an image of the back of the magnetic stripe card 120 associated with the account that the user 101 desires to input into the mobile computing device. For example, a user 101 can capture an image of the magnetic stripe card 120 with the camera on a user computing device 110 and access the image with the card image processing module 115 on the user computing device 110. The image can alternatively be captured by a merchant system, payment processing system 140, or any suitable party.

In block 220, the card image processing module 115 processes the image to remove perspective distortion. For example, the image may not have been captured from the preferred angle, or the magnetic stripe card 120 in the image may not fit the required frame for the image. The card image processing module 115 can alter or resize the image to fit any required parameters for processing in the manner in which the card image processing module 115 is configured to process images. In an example, the card image processing module 115 can detect the corners or edges of the magnetic stripe card 120 in the image and then map the corners or edges to a rectangle of the correct ratios for a credit card. The card image processing module 115 can perform any other required image adjustments to provide a clear and useful image suitable for processing to obtain information included therein. The card image processing module 115 can process the image through any automated image processing algorithm stored on the card image processing module 115 or the card image processing module 115 can provide a user interface to allow the user 101 to process the image manually.

In block 230, the card image processing module 115 detects the reversed embossed characters on the back of the magnetic stripe card 120. For example, the card image processing module 115 can detect the credit card number, name, expiration date, and other embossed information from the back of magnetic stripe card 120. The detection can leverage known specifications for where characters are embossed within the space of the magnetic stripe card 120, by analyzing specific locations on the magnetic stripe card 120 for the corresponding information included in each specific location. For example, the card image processing module 115 can access a database, or other stored data, of credit card information placement. The database can store the typical locations on the card face of the typical data on a magnetic stripe card 120, such as the card number and the expiration date. Additionally, the card image processing module 115 can search the image of the magnetic stripe card 120 for information that is not located in an expected location. The card image processing module 115 can employ character recognition algorithms or related techniques to identify a set of characters from the information identified on the magnetic stripe card 120.

Once embossed characters are located within the image of the back of the magnetic stripe card 120, they can be reversed, or mirrored, for normal recognition. That is, as the embossed images on the back of the magnetic stripe card 120 are reversed, the card image processing module 115 can process the characters to provide a mirror image of the characters to allow a character recognition algorithm to interpret the characters. After processing, the embossed set of characters appears "debossed" and reversed from the image. Alternatively, a reverse character recognition algorithm may be used that is capable of interpreting reversed characters.

In block 240, the card image processing module 115 can additionally or alternatively detect additional printed information from the back of the magnetic stripe card 120 that is not embossed or reversed. For example, the security code, signature, issuer name, address, and phone number, and other information of the issuing institution are generally not embossed and are generally located on the back of a magnetic stripe card 120. The card image processing module 115 can read the printed information via any character recognition software stored on the card image processing module 115, or via any suitable method.

In block 250, after processing the information from the image to obtain an alpha-numeric character set for the information from the image, the card image processing module 115 can verify uncertain detection with user 101. For example, the user 101 may be queried to verify the processed information via a user interface provided by the card image processing module 115 or the user computing device 110. The user 101 may be prompted to verify the magnetic stripe card 120 information as a default for some or all of the information. Alternatively, the user 101 may only be required to verify information if the detection algorithms have a low confidence in the accuracy of the processed information. For example, if the detection algorithms have a less than 90% certainty of the accuracy of the character set, then the card image processing module 115 can provide the character set to the user 101 on a user interface of the card image processing module 115 and request a verification or modification of the character set.

In block 260, the card image processing module 115 can provide the detected card information for processing. The card image processing module 115 can categorize the information obtained from the magnetic stripe card 120. For example, the card image processing module 115 can determine that a set of characters from the magnetic stripe card 120 relates to the account number, the user name, the expiration data, and other suitable information. The set of characters can be stored in the card image processing module 115 with a designation associating the series of characters with the appropriate category. For example, a series of 16 numbers would be associated with an account identifier. A four digit series with a "/" in the middle would be associated with an expiration date.

The card image processing module 115 can provide detected magnetic stripe card 120 information for further processing. In certain embodiments, the information may be communicated to a payment processing system 140 or other computing system to process a payment or other operation associated with the magnetic stripe card 120. For example, the card image processing module 115 can communicate the card information to a digital wallet application module executing on the user computing device 110 or otherwise associated with the user 101 of the magnetic stripe card 120 for use in a transaction with a merchant or other entity. In another example, the user computing device 110 can use the magnetic stripe card 120 information to populate a payment form or other online transaction form to conduct a transaction. In another example, a merchant can use the magnetic stripe card 120 information to populate a transaction page on a point of sale terminal or other transaction user interface. The magnetic stripe card 120 information can be employed for any other suitable purpose.

FIG. 3 is a block diagram depicting a method for detecting magnetic stripe card 120 information by comparing results from front and reverse side image detection, in accordance with certain example embodiments.

In an example embodiment, correlation between images of the front and back of the magnetic stripe card 120 may help improve the accuracy of reading the magnetic stripe card 120. An image of the front of the magnetic stripe card 120 may be harder to read because of background images, the embossing, and other information provided on the front of the magnetic stripe card 120. The back of the magnetic stripe card 120 often overlaps with customer service information, the signature, or other images or information. Thus, errors may occur when extracting the characters and other user information from an image of the magnetic stripe card 120.

Since both the front and the back of the magnetic stripe card 120 contain some of the same information, such as the embossed information, the card image processing module 115 can compare information from the front of the magnetic stripe card 120 with information from the back of the magnetic stripe card 120 and note similarities and differences. Information from the front of the magnetic stripe card 120 that matches the information from the back of the magnetic stripe card 120 can be expected to be more accurate. If the information from the front of the magnetic stripe card 120 does not match the same information on the back of the magnetic stripe card 120, then the card image processing module 115 may require user 101 input to select or input the correct information.

In block 310, a card image processing module 115 on the user computing device 110 receives the image of the front of the magnetic stripe card 120. The user 101 employs a mobile phone, digital camera, or other user computing device 110 to capture an image of the back of the magnetic stripe card 120 associated with the account that the user 101 desires to input into the mobile computing device. For example, a user 101 can capture an image of the magnetic stripe card 120 with the camera on a user computing device 110 and access the image with the card image processing module 115 on the user computing device 110. The image can alternatively be captured by a merchant system, payment processing system 140, or any suitable party.

In block 320, a card image processing module 115 on the user computing device 110 receives the image of the back of the magnetic stripe card 120. The user 101 employs a mobile phone, digital camera, or other user computing device 110 to capture an image of the back of the magnetic stripe card 120 associated with the account that the user 101 desires to input into the mobile computing device. For example, a user 101 can capture an image of the magnetic stripe card 120 with the camera on a user computing device 110 and access the image with the card image processing module 115 on the user computing device 110. The image can alternatively be captured by a merchant system, payment processing system 140, or any suitable party.

In block 330, the card image processing module 115 processes the image of the front and the image of the back of the magnetic stripe card 120 to remove perspective distortion. For example, the images may not have been captured from the preferred angle, or the magnetic stripe card 120 in the images may not fit the required frame for the image. The card image processing module 115 can alter or resize the images to fit any required parameters for processing in the manner in which the image processing module is configured to process images. In an example, the card image processing module 115 can detect the corners or edges of the magnetic stripe card 120 in one of the images and then map the corners or edges to a rectangle of the correct ratios for a credit card. The card image processing module 115 can perform any other required image adjustments to provide a clear and useful image suitable for processing to obtain information included therein. The card image processing module 115 can process the images through any automated image processing algorithm stored on the card image processing module 115 or the card image processing module 115 can provide a user interface to allow the user 101 to process the images manually.

In block 340, the card image processing module 115 detects the embossed characters on the front of the magnetic stripe card 120. For example, the card image processing module 115 can detect the credit card number, name, expiration date, and other embossed information from the front of magnetic stripe card 120. The detection can leverage known specifications for where characters are embossed within the space of the magnetic stripe card 120, by analyzing specific locations on the magnetic stripe card 120 for the corresponding information included in each specific location. For example, the card image processing module 115 can access a database, or other stored data, of credit card information placement. The database can store the typical locations on the face of the typical data on a magnetic stripe card 120, such as the card number and the expiration date. Additionally, the card image processing module 115 can search the image of the magnetic stripe card 120 for information that is not located in an expected location. The card image processing module 115 can employ character recognition algorithms or related techniques to identify a set of characters from the information identified on the magnetic stripe card 120.

Once embossed characters are located within the image of the front of the magnetic stripe card 120, the card image processing module 115 can process the characters to allow a character recognition algorithm to interpret the characters. After processing, the embossed set of characters appears "debossed" on the image. That is, the characters no longer appear to be embossed and are more easily interpreted and recognized.

In block 350, the card image processing module 115 detects the reversed embossed characters on the back of the magnetic stripe card 120. For example, the card image processing module 115 can detect the credit card number, name, expiration date, and other embossed information from the back of magnetic stripe card 120. The detection can leverage known specifications for where characters are embossed within the space of the magnetic stripe card 120, by analyzes specific locations on the magnetic stripe card 120 for the corresponding information included in each specific location. For example, the card image processing module 115 can access a database, or other stored data, of credit card information placement. The database can store the typical locations on the face of the typical data on a magnetic stripe card 120, such as the card number and the expiration date. Additionally, the card image processing module 115 can search the image of the magnetic stripe card 120 for information that is not located in an expected location. The card image processing module 115 can employ character recognition algorithms or related techniques to identify a set of characters from the information identified on the magnetic stripe card 120.

Once embossed characters are located within the image of the back of the magnetic stripe card 120, they can be reversed, or mirrored, for normal recognition. That is, as the embossed images on the back of the magnetic stripe card 120 are reversed, the card image processing module 115 can process the characters to provide a mirror image of the characters to allow a character recognition algorithm to interpret the characters. After processing, the embossed set of characters appears "debossed" and reversed from the image.

In block 360, the card image processing module 115 can additionally or alternatively detect additional printed information from the back of the magnetic stripe card 120 that is not embossed or reversed. For example, the security code, signature, issuer name, address, and phone number, and other information of the issuing institution are generally not embossed and are generally located on the back of a magnetic stripe card 120. The card image processing module 115 can read the printed information via any character recognition software stored on the card image processing module 115, or via any suitable method.

In block 370, the card image processing module 115 can compare detected information from the front and back of the magnetic stripe card 120. Correlation between images of the front and back of the magnetic stripe card 120 may help improve the accuracy of reading the magnetic stripe card 120. After determining the category of each series of characters from the images of the front and back of the magnetic stripe card 120, the card image processing module 115 can compare the information from the front of the magnetic stripe card 120 with the information from the back of the magnetic stripe card 120.

For example, the card image processing module 115 can compare a series of characters from the back associated with the user 101 name to the series of characters from the front associated with the user 101 name. The card image processing module 115 can use the comparison to determine a confidence score for the accuracy of the user 101 name. If the comparison produces an exact match, then the confidence score for the user 101 name would be high. If a conflict exists between the two, then the confidence score for the user 101 name would be lower. The relative confidence score can depend on a number of conflicts between the information from the front and back sides of the magnetic stripe card 120. If the confidence score is below a configurable threshold, the card image processing module 115 may request an input from the user 101 to verify the correct information. For example, the card image processing module 115 may provide the results extracted from the front of the magnetic stripe card 120 and the results extracted from the back of the magnetic stripe card 120 and allow the user 101 to select the correct information or input alternate information.

In an example embodiment, the card image processing module 115 can apply independent character recognition applications to the characters on the front and back of the magnetic stripe card 120. For example, the card image processing module 115 can host two or more character recognition applications and apply one character recognition application to the front of the magnetic stripe card 120 and a different character recognition application to the back of the magnetic stripe card 120. After determining the category of each series of characters, the card image processing module 115 can compare the information from the front of the magnetic stripe card 120 with the information from the back of the magnetic stripe card 120 to improve the accuracy of the information. The agreement of different character recognizer processing applications on the characters on the front and back of the magnetic stripe card 120 can provide a greater degree of confidence in the extracted information.

In another example embodiment, the card image processing module 115 can extract features from corresponding locations on the front and back of the magnetic stripe card 120, and feed the combined features into a single classifier. The card image processing module 115 can extract the embossed characters from the same area of the magnetic stripe card 120 on the front and the back. For example, the card image processing module 115 can extract the account number from the front of the magnetic stripe card 120 and combine the characters with the characters extracted from the same, although reversed, location on the back of the magnetic stripe card 120.

The card image processing module 115 can reverse one of the sets of characters and process the two sets of characters together to achieve a more accurate set of characters. The card image processing module 115 can apply a character recognition application to the characters to identify the set of characters and categorize the information.

In another example embodiment, the card image processing module 115 can search for and identify correlations between pixels on the front and back of the magnetic stripe card 120, and extract pixels for which there are strong correlations. The card image processing module 115 can process digital images of the front and back of the magnetic stripe card 120 and compare the individual pixels searching for correlations and differences. The pixels with high correlations are likely to be corresponding parts of characters rather than of the backgrounds. The correlated pixels can allow a greater level of accuracy when identifying and recognizing characters.

In another example embodiment, the card image processing module 115 can use more than one source to extract additional information. The card image processing module 115 can process multiple images of the front, the back, or both. For example, the user 101 can provide multiple images captured from different angles to allow the card image processing module 115 to better filter shadows, scratches, or other obstructions. Additionally or alternatively, the user 101 can provide a video moving across the magnetic stripe card 120 such that many angles can provide more information to the card image processing module 115 for processing.

In block 380, after processing the information from the images to obtain an alpha-numeric character set for the information from the images, the card image processing module 115 can verify uncertain detection with user 101. For example, the user 101 may be queried to verify the processed information via a user interface provided by the card image processing module 115 or the user computing device 110. The user 101 may be prompted to verify the card information as a default for some or all of the information. Alternatively, the user 101 may only be required to verify information if the detection algorithms have a low confidence in the accuracy of the processed information. For example, if the detection algorithms have a less than 90% certainty of the accuracy of the character set, then the card image processing module 115 can provide the character set to the user 101 on a user interface of the card image processing module 115 and request a verification or modification of the character set.

In block 390, the card image processing module 115 can provide the detected magnetic stripe card 120 information for processing. The card image processing module 115 can categorize the information obtained from the magnetic stripe card 120. For example, the card image processing module 115 can determine that a set of characters from the magnetic stripe card 120 relates to the account number, the user 101 name, the expiration data, and other suitable information. The set of characters can be stored in the card image processing module 115 with a designation associating the series of characters with the appropriate category. For example, a series of 16 numbers would be associated with an account identifier. A four digit series with a "/" in the middle would be associated with an expiration date.

The card image processing module 115 can provide detected magnetic stripe card 120 information for further processing. In certain embodiments, the information may be communicated to a payment processing system 140 or other computing system to process a payment or other operation associated with the magnetic stripe card 120. For example, the card image processing module 115 can communicate the magnetic stripe card 120 information to a digital wallet application module executing on the user computing device 110 or otherwise associated with the user 101 of the magnetic stripe card 120 for use in a transaction with a merchant or other entity. In another example, the user computing device 110 can use the magnetic stripe card 120 information to populate a payment form or other online transaction form to conduct a transaction. In another example, a merchant can use the magnetic stripe card 120 information to populate a transaction page on a point of sale terminal or other transaction user interface. The magnetic stripe card 120 information can be employed for any other suitable purpose.

Although described herein as executing on the user computing device 110, the card image processing module 115 can execute on any suitable computing device. For example, the card image processing module 115 can execute on a payment processing system 140, a merchant point of sale system, a digital wallet account management system, or other suitable computing system. In these embodiments, the captured images of the front and back of the magnetic stripe card 120 are communicated from the image capture device to the processing computing system for processing of the image information.

In an example, a computer program product comprises a non-transitory computer-readable storage device having computer-executable program instructions embodied thereon that when executed by a computer cause the computer to select payment instruments for proxy card transactions. The computer-executable program instructions comprises computer-executable program instructions to receive an image of a back side of a payment instrument, the payment instrument comprising information imprinted thereon such that the imprinted information protrudes from a front side of the payment instrument and the imprinted information is indented into the back side of the payment instrument. In an example, the computer-executable program instructions extract sets of characters from the image of the back side of the payment instrument based on the imprinted information indented into the back side of the payment instrument and depicted in the image of the back side of the payment instrument. In an example, the computer-executable program instructions apply a first character recognition application to process the sets of characters extracted from the image of the back side of the payment instrument and categorize each of the sets of characters into one of a plurality of categories relating to information required to conduct a payment transaction.

In another example, the computer program product further comprises computer-executable program instructions to communicate the sets of characters and the categories associated with the sets of characters to a digital wallet application module for use in a payment transaction. In another example, the computer program product further comprises computer-executable program instructions to receive the imprinted information from the back side of the payment instrument in connection with applying the first character recognition application. In another example, the computer program product further comprises computer-executable program instructions to receive an image of a front side of the payment instrument. In another example, the computer program product further comprises computer-executable program instructions to extract sets of characters from the image of the front side of the payment instrument based on the imprinted information protruding from the front side of the payment instrument and depicted in the image of the front side of the payment instrument. In another example, the computer program product further comprises computer-executable program instructions to apply a second character recognition application to process the sets of characters extracted from the image of the front side of the payment instrument. In another example, the computer program product further comprises computer-executable program instructions to categorize each of the sets of characters into one of the plurality of categories relating to information required to conduct a payment transaction. In another example, the computer program product further comprises computer-executable program instructions to compare a processed set of characters from the front side of the payment instrument associated with a particular one of the categories to a processed set of characters from the back side of the payment instrument associated with the particular one of the categories and computer-executable program instructions to refine the processing of the compared sets of characters from the front side and the back side of the payment instrument based on the comparison of the compared sets of characters from the front side and the back side of the payment instrument.

In an example, a system to select payment instruments for proxy card transactions comprises a storage resource and a processor communicatively coupled to the storage resource. In an example, the processor executes application code instructions that are stored in the storage resource and that cause the system to receive an image of a back side of a payment instrument, the payment instrument comprising information imprinted thereon such that the imprinted information protrudes from a front side of the payment instrument and the imprinted information is indented into the back side of the payment instrument. In an example, the processor extracts sets of characters from the image of the back side of the payment instrument based on the imprinted information indented into the back side of the payment instrument and depicted in the image of the back side of the payment instrument. In an example, the processor applies a first character recognition application to process the sets of characters extracted from the image of the back side of the payment instrument. In an example, the processor categorizes each of the sets of characters into one of a plurality of categories relating to information required to conduct a payment transaction.

In an example, processor executes further application code instructions to receive an image of a front side of the payment instrument. In an example, processor executes further application code instructions to extract sets of characters from the image of the front side of the payment instrument based on the imprinted information protruding from the front side of the payment instrument and depicted in the image of the front side of the payment instrument. In an example, processor executes further application code instructions to apply a second character recognition application to process the sets of characters extracted from the image of the front side of the payment instrument. In an example, processor executes further application code instructions to categorize each of the sets of characters into one of the plurality of categories relating to information required to conduct a payment transaction. In an example, processor executes further application code instructions to compare a processed set of characters from the front side of the payment instrument associated with a particular one of the categories to a processed set of characters from the back side of the payment instrument associated with the particular one of the categories. In an example, processor executes further application code instructions to refine the processing of the compared sets of characters from the front side and the back side of the payment instrument based on the comparison of the compared sets of characters from the front side and the back side of the payment instrument.

In an example, processor executes further application code instructions to display a request for a validation or correction of at least one of the sets of characters, in response to the comparison determining that the processed set of characters from the front side of the payment instrument associated with the particular one of the categories differ from the processed set of characters from the back side of the payment instrument associated with the particular one of the categories. In an example, processor executes further application code instructions to receive an image of the front side of the payment instrument, determine a first set of characters from the front of the payment instrument that are in a location on the payment instrument that corresponds to a second set of characters on the back side of the payment instrument; and combine the first set of characters and the second set of characters to produce an image of a combined set of characters, wherein the first character recognition process is applied to the combined set of characters.

Example Systems

Figure 6:
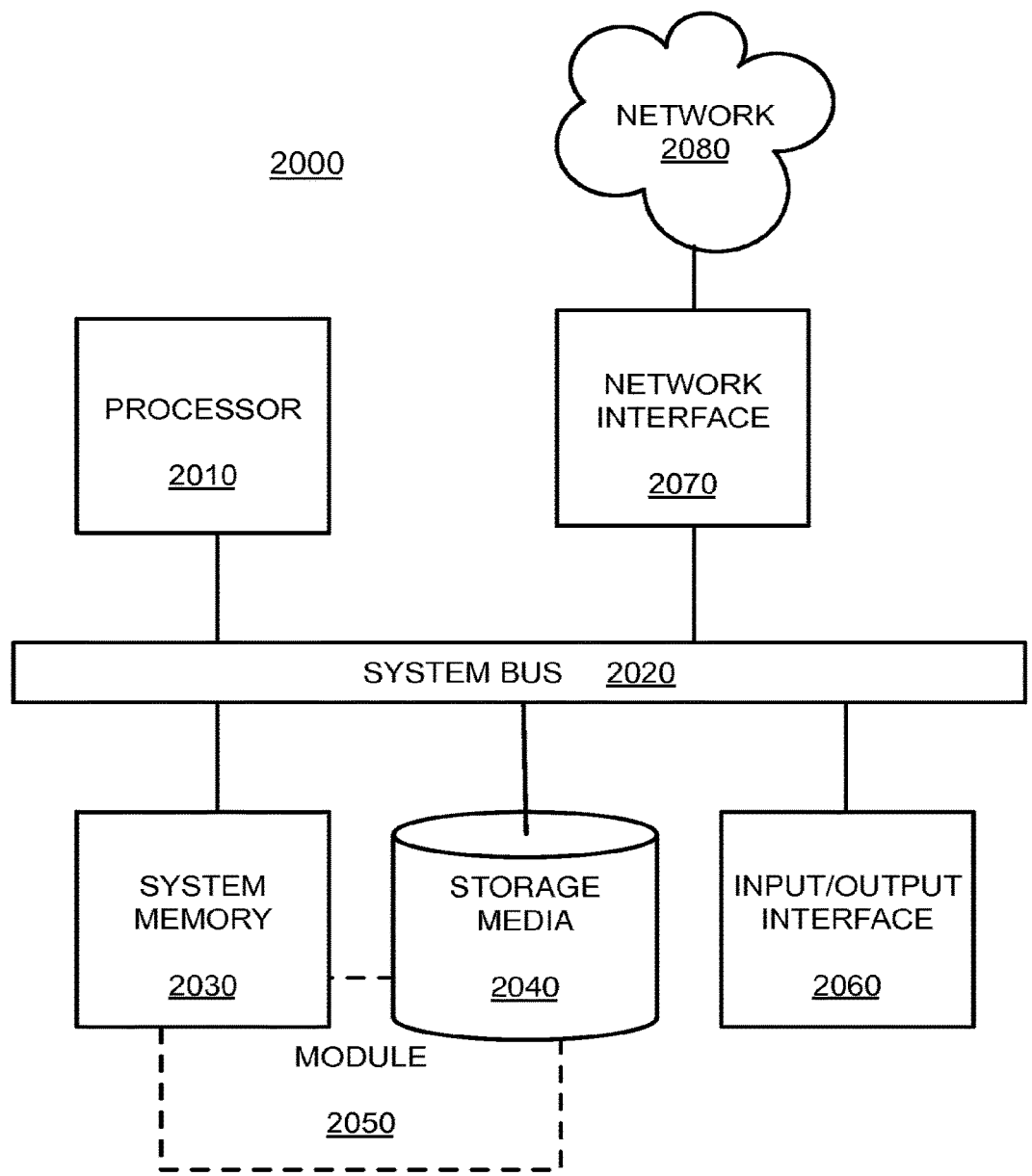
FIG. 6 is a block diagram depicting a computing machine and a module, in accordance with certain example embodiments.

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method for capturing information from imprinted items, comprising:
   receiving, using one or more computing devices, an image of a back side of an imprinted item, the imprinted item comprising information imprinted thereon such that the imprinted information protrudes from a front side of the imprinted item and the imprinted information is indented into the back side of the imprinted item;
   extracting, using the one or more computing devices, sets of characters from the image of the back side of the imprinted item based on the imprinted information indented into the back side of the imprinted item and depicted in the image of the back side of the imprinted item;
   applying, using the one or more computing devices, a first character recognition application to process the sets of characters extracted from the image of the back side of the imprinted item; and
   categorizing, using the one or more computing devices, each of the sets of characters into one of a plurality of categories relating to information required to use data from the imprinted item.

2. The computer-implemented method of claim 1, further comprising communicating, using the one or more computing devices, the sets of characters and the categories associated with the sets of characters to a third party application.

3. The computer-implemented method of claim 1, further comprising reversing, using the one or more computing devices, the imprinted information from the back side of the imprinted item in connection with applying the first character recognition application.

4. The computer-implemented method of claim 1, further comprising:
   receiving, using the one or more computing devices, an image of a front side of the imprinted item;
   extracting, using the one or more computing devices, sets of characters from the image of the front side of the imprinted item based on the imprinted information protruding from the front side of the imprinted item and depicted in the image of the front side of the imprinted item;
   applying, using the one or more computing devices, a second character recognition application to process the sets of characters extracted from the image of the front side of the imprinted item;
   categorizing, using the one or more computing devices, each of the sets of characters into one of the plurality of categories relating to information required to use data from the imprinted item;
   comparing, using the one or more computing devices, a processed set of characters from the front side of the imprinted item associated with a particular one of the categories to a processed set of characters from the back side of the imprinted item associated with the particular one of the categories; and
   refining, using the one or more computing devices, the processing of the compared sets of characters from the front side and the back side of the imprinted item based on the comparison of the compared sets of characters from the front side and the back side of the imprinted item.

5. The computer-implemented method of claim 4, further comprising:

displaying, using the one or more computing devices, a request for a validation or correction of at least one of the sets of characters, in response to the comparison determining that the processed set of characters from the front side of the imprinted item associated with the particular one of the categories differ from the processed set of characters from the back side of the imprinted item associated with the particular one of the categories.

6. The computer-implemented method of claim 4, wherein the first and second character recognition applications are a same application.

7. The computer-implemented method of claim 4, wherein the first and second character recognition applications are different.

8. The computer-implemented method of claim 1, further comprising:
receiving, using the one or more computing devices, an image of the front side of the imprinted item;
determining, using the one or more computing devices, a first set of characters from the front of the imprinted item that are in a location on the imprinted item that corresponds to a second set of characters on the back side of the imprinted item; and
combining, using the one or more computing devices, the images of the first set of characters and the second set of characters to produce a combined set of characters, wherein the first character recognition process is applied to the combined set of characters.

9. The computer-implemented method of claim 1, wherein the image of back side of the imprinted item is captured by a camera operating on the one or more computing devices.

10. The computer-implemented method of claim 1, wherein the categories comprise one or more of a user account number, a user name, an account expiration date, a phone number of an issuer of the account, and a signature of the user.

11. A computer program product, comprising:
a non-transitory computer-readable storage device having computer-executable program instructions embodied thereon that when executed by a computer cause the computer to capture information from imprinted items, the computer-executable program instructions comprising:
computer-executable program instructions to receive an image of a back side of an imprinted item, the imprinted item comprising information imprinted thereon such that the imprinted information protrudes from a front side of the imprinted item and the imprinted information is indented into the back side of the imprinted item;
computer-executable program instructions to extract sets of characters from the image of the back side of the imprinted item based on the imprinted information indented into the back side of the imprinted item and depicted in the image of the back side of the imprinted item;
computer-executable program instructions to apply a first character recognition application to process the sets of characters extracted from the image of the back side of the imprinted item; and
computer-executable program instructions to categorize each of the sets of characters into one of a plurality of categories relating to information required to use data from the imprinted item.

12. The computer program product of claim 11, further comprising computer-executable program instructions to communicate the sets of characters and the categories associated with the sets of characters to a third party application.

13. The computer program product of claim 11, further comprising computer-executable program instructions to reverse the imprinted information from the back side of the imprinted item in connection with applying the first character recognition application.

14. The computer program product of claim 11, further comprising:
computer-executable program instructions to receive an image of a front side of the imprinted item;
computer-executable program instructions to extract sets of characters from the image of the front side of the imprinted item based on the imprinted information protruding from the front side of the imprinted item and depicted in the image of the front side of the imprinted item;
computer-executable program instructions to apply a second character recognition application to process the sets of characters extracted from the image of the front side of the imprinted item;
computer-executable program instructions to categorize each of the sets of characters into one of the plurality of categories relating to information required to use data from the imprinted item;
computer-executable program instructions to compare a processed set of characters from the front side of the imprinted item associated with a particular one of the categories to a processed set of characters from the back side of the imprinted item associated with the particular one of the categories; and
computer-executable program instructions to refine the processing of the compared sets of characters from the front side and the back side of the imprinted item based on the comparison of the compared sets of characters from the front side and the back side of the imprinted item.

15. A system for capturing information from imprinted items, the system comprising:
a storage resource; and
a processor communicatively coupled to the storage resource, wherein the processor executes application code instructions that are stored in the storage resource and that cause the system to:
receive an image of a back side of an imprinted item, the imprinted item comprising information imprinted thereon such that the imprinted information protrudes from a front side of the imprinted item and the imprinted information is indented into the back side of the imprinted item;
extract sets of characters from the image of the back side of the imprinted item based on the imprinted information indented into the back side of the imprinted item and depicted in the image of the back side of the imprinted item;
apply a first character recognition application to process the sets of characters extracted from the image of the back side of the imprinted item; and
categorize each of the sets of characters into one of a plurality of categories relating to information required to use data from the imprinted item.

16. The system of claim 15, the processor executing further application code instructions that are stored in the storage device and that cause the system to:

receive an image of a front side of the imprinted item;
extract sets of characters from the image of the front side of the imprinted item based on the imprinted information protruding from the front side of the imprinted item and depicted in the image of the front side of the imprinted item;
apply a second character recognition application to process the sets of characters extracted from the image of the front side of the imprinted item;
categorize each of the sets of characters into one of the plurality of categories relating to information required to use data from the imprinted item;
compare a processed set of characters from the front side of the imprinted item associated with a particular one of the categories to a processed set of characters from the back side of the imprinted item associated with the particular one of the categories; and
refine the processing of the compared sets of characters from the front side and the back side of the imprinted item based on the comparison of the compared sets of characters from the front side and the back side of the imprinted item.

17. The system of claim 16, the processor executing further application code instructions that are stored in the storage device and that cause the system to display a request for a validation or correction of at least one of the sets of characters, in response to the comparison determining that the processed set of characters from the front side of the imprinted item associated with the particular one of the categories differ from the processed set of characters from the back side of the imprinted item associated with the particular one of the categories.

18. The system of claim 16, wherein the first and second character recognition applications are a same application.

19. The system of claim 16, the processor executing further application code instructions that are stored in the storage device and that cause the system to:
receive an image of the front side of the imprinted item;
determine a first set of characters from the front of the imprinted item that are in a location on the imprinted item that corresponds to a second set of characters on the back side of the imprinted item; and
combine the first set of characters and the second set of characters to produce an image of a combined set of characters, wherein the first character recognition process is applied to the combined set of characters.

* * * * *